US012270231B2

(12) United States Patent
Arlinghaus et al.

(10) Patent No.: US 12,270,231 B2
(45) Date of Patent: Apr. 8, 2025

(54) MOTORIZED LATCH RETRACTION WITH RETURN BOOST

(71) Applicant: Schlage Lock Company LLC, Carmel, IN (US)

(72) Inventors: Paul R. Arlinghaus, Fishers, IN (US); Evan Ballard, Noblesville, IN (US); Suresha Chandrasekhara, Bangarapet Taluk (IN); Eric Hoiland, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 121 days.

(21) Appl. No.: 17/746,412

(22) Filed: May 17, 2022

(65) Prior Publication Data

US 2022/0275666 A1 Sep. 1, 2022

Related U.S. Application Data

(63) Continuation of application No. 16/268,734, filed on Feb. 6, 2019, now Pat. No. 11,332,961.

(51) Int. Cl.
*E05B 65/10* (2006.01)
*E05B 15/04* (2006.01)
*E05B 47/00* (2006.01)

(52) U.S. Cl.
CPC ............ *E05B 65/108* (2013.01); *E05B 15/04* (2013.01); *E05B 47/0012* (2013.01);
(Continued)

(58) Field of Classification Search
CPC ...... E05B 65/108; E05B 15/004; E05B 15/04; E05B 47/0012; E05B 65/1053;
(Continued)

(56) References Cited

U.S. PATENT DOCUMENTS 3,945,670 A 3/1976 Peterson
4,875,722 A 10/1989 Miller et al.
(Continued)

FOREIGN PATENT DOCUMENTS

FR 3029233 A1 6/2016
WO 2014199350 A1 12/2014
(Continued)

OTHER PUBLICATIONS

Australian Examination Report; Australian Intellectual Property Office; Australian Patent Application No. 2020219241; Feb. 3, 2023; 6 pages.
(Continued)

*Primary Examiner* — Mark A Williams
(74) *Attorney, Agent, or Firm* — Taft Stettinius & Hollister LLP

(57) ABSTRACT

An exemplary electronic actuator assembly is configured for use with a pushbar assembly having a drive assembly operable to retract a latchbolt, and includes an input shaft, a motor, and a boost spring. The motor has a retracting state in which the motor drives the input shaft from a proximal position to a distal position, a holding state in which the motor exerts a holding force to retain the input shaft in the distal position, and a releasing state in which the motor exerts a residual force that resists movement of the input shaft. The boost spring exerts a boost force urging the input shaft in the proximal direction to at least partially counteract the residual force.

20 Claims, 7 Drawing Sheets

(52) U.S. Cl.
CPC .. *E05B 65/1053* (2013.01); *E05B 2015/0448* (2013.01); *E05B 2047/0016* (2013.01); *E05B 2047/0037* (2013.01); *E05Y 2900/132* (2013.01)

(58) Field of Classification Search
CPC ..... E05B 2047/0016; E05B 2047/0037; E05B 2015/0448; E05Y 2900/132
See application file for complete search history.

(56) References Cited

U.S. PATENT DOCUMENTS

| | | | | |
|---|---|---|---|---|
| 5,011,199 | A | 4/1991 | Lowe et al. | |
| 5,412,961 | A * | 5/1995 | Cain | E05B 63/0065 70/92 |
| 6,565,130 | B1 * | 5/2003 | Walsh, III | E05B 47/0002 292/201 |
| 7,484,777 | B2 | 2/2009 | Condo et al. | |
| 7,862,091 | B2 * | 1/2011 | Escobar | E05B 47/023 292/201 |
| 8,182,003 | B2 * | 5/2012 | Dye | E05B 65/1053 292/216 |
| 8,495,836 | B2 | 7/2013 | Lowder et al. | |
| 8,978,305 | B2 * | 3/2015 | Morstatt | E05B 65/1093 292/201 |
| 10,017,964 | B2 | 7/2018 | Corwin, Jr. | |
| 10,030,411 | B2 | 7/2018 | Coleman et al. | |
| 10,072,444 | B2 | 9/2018 | Lehner, Jr. et al. | |
| 2011/0047874 | A1 * | 3/2011 | Lowder | E05B 65/1053 49/31 |
| 2015/0137528 | A1 | 5/2015 | Geringer et al. | |
| 2015/0184426 | A1 * | 7/2015 | Arlinghaus | E05B 65/108 292/138 |
| 2015/0376921 | A1 | 12/2015 | Corwin, Jr. | |
| 2016/0333621 | A1 * | 11/2016 | Lehner, Jr. | E05F 11/54 |
| 2017/0102058 | A1 * | 4/2017 | Stephenson | E05B 47/0012 |
| 2017/0292294 | A1 * | 10/2017 | Brennan | E05B 65/108 |
| 2018/0119456 | A1 | 5/2018 | Blanchard et al. | |
| 2021/0332609 | A1 | 11/2021 | Leung et al. | |

FOREIGN PATENT DOCUMENTS

| | | | |
|---|---|---|---|
| WO | 2019/032673 | A2 | 2/2019 |
| WO | 2019/062925 | A1 | 4/2019 |
| WO | 2020/106965 | A1 | 5/2020 |

OTHER PUBLICATIONS

Extended European Search Report; European Patent Office; European Patent Application No. 20753060.1; Nov. 2, 2022; 8 pages.
Australian Examination Report; Australian Intellectual Property Office; Australian Patent Application No. 2020219241; Aug. 11, 2022; 6 pages.
Australian Examination Report; Australian Intellectual Property Office; Australian Patent Application No. 2020219241; Aug. 24, 2022; 3 pages.
Australian Examination Report; Australian Intellectual Property Office; Australian Patent Application No. 2020219241; Oct. 26, 2022; 7 pages.
Canadian Examination Report; Canadian Intellectual Property Office; Canadian Patent Application No. 3,129,400; Jan. 19, 2024; 4 pages.
International Search Report; International Searching Authority; International Application No. PCT/US2020/017039; May 1, 2020; 3 pages.
Written Opinion of the International Searching Authority; International Searching Authority; International Application No. PCT/US2020/017039; May 1, 2020; 5 pages.
Canadian Examination Report; Canadian Intellectual Property Office; Canadian Patent Application No. 3,129,400; Oct. 12, 2022; 4 pages.
New Zealand Examination Report; New Zealand Intellectual Property Office; New Zealand Patent Application No. 779471; May 29, 2023; 3 pages.
New Zealand Examination Report; New Zealand Intellectual Property Office; New Zealand Patent Application No. 779471; Jul. 19, 2023; 2 pages.
Australian Examination Report; IP Australia; Australia Patent Application No. 2023204175; Jun. 13, 2024; 5 pages.
Australian Examination Report No. 2; Australian Patent Office; Australian Patent Application No. 2023204175; Sep. 19, 2024; 3 pages.
New Zealand Examination Report No. 1; New Zealand Intellectual Property Office; New Zealand Patent Application No. 802152; Jan. 16, 2025; 5 pages.

* cited by examiner

MOTORIZED LATCH RETRACTION WITH RETURN BOOST

CROSS-REFERENCE TO RELATED APPLICATIONS

The present application is a continuation of U.S. patent application Ser. No. 16/268,734 filed Feb. 6, 2019 and issued as U.S. Pat. No. 11,332,961, the contents of which are incorporated herein by reference in their entirety.

TECHNICAL FIELD

The present disclosure generally relates to access control devices, and more particularly but not exclusively relates to exit devices.

BACKGROUND

Exit devices are commonly installed to doors to facilitate egress from a room. Certain exit devices include electronic actuators operable to actuate the exit device to provide for push-pull operation of the door on which the exit device is installed. However, it has been found that while certain existing electronic actuators are capable of transitioning the exit device to the actuated state thereof, there are circumstances in which the actuator prevents return of the exit device to the deactuated state upon removal of electrical power from the actuator. For these reasons among others, there remains a need for further improvements in this technological field.

SUMMARY

An exemplary electronic actuator assembly is configured for use with a pushbar assembly having a drive assembly operable to retract a latchbolt, and includes an input shaft, a motor, and a boost spring. The motor has a retracting state in which the motor drives the input shaft from a proximal position to a distal position, a holding state in which the motor exerts a holding force to retain the input shaft in the distal position, and a releasing state in which the motor exerts a residual force that resists movement of the input shaft. The boost spring exerts a boost force urging the input shaft in the proximal direction to at least partially counteract the residual force. Further embodiments, forms, features, and aspects of the present application shall become apparent from the description and figures provided herewith.

DETAILED DESCRIPTION OF ILLUSTRATIVE EMBODIMENTS

Figure 1:
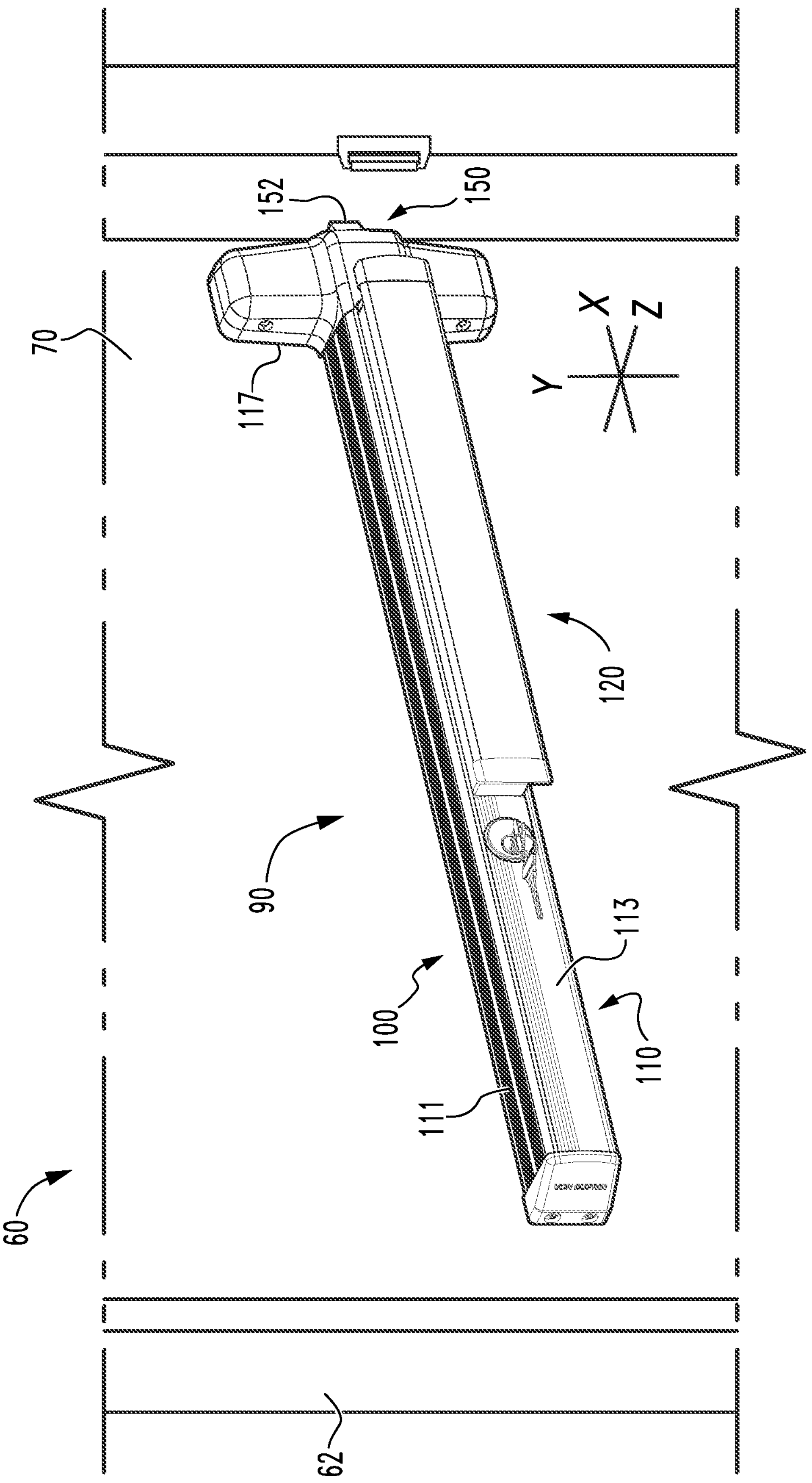
FIG. 1 is a perspective illustration of a closure assembly including an exit device according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. The directions defined by each axis may be referred to as positive and negative directions, wherein the arrow of the axis indicates the positive direction. In the coordinate system illustrated in FIG. 1, the X-axis defines first and second longitudinal directions, the Y-axis defines first and second lateral directions, and the Z-axis defines first and second transverse directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements which are described as being "laterally offset" from one another may also be offset in the longitudinal and/or transverse directions, or may be aligned in the longitudinal and/or transverse directions. The terms are therefore not to be construed as limiting the scope of the subject matter described herein.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

With reference to FIG. 1, illustrated therein is a closure assembly 60 including a swinging door 70 and an exit device 90 mounted to the door 70. The door 70 is mounted to a doorframe 62 for swinging movement between an open position and a closed position, and the exit device 90 is configured to selectively retain the door 70 in the closed position. In certain embodiments, the closure assembly 60 may be considered to further include the doorframe 62. The closure assembly 60 has a plurality of states or conditions, including a secured condition, an unsecured condition, and an open condition. In the secured condition, the door 70 is in its closed position, the exit device 90 is in a deactuated state, and the exit device 90 engages the doorframe and retains the door 70 in its closed position. Actuation of the exit device 90 causes the closure assembly 60 to transition to the unsecured condition, in which the door 70 is capable of being moved from its closed position to its open position under push/pull operation. Such movement of the door 70 to its open position causes the closure assembly 60 to transition to the open condition.

Figure 2:
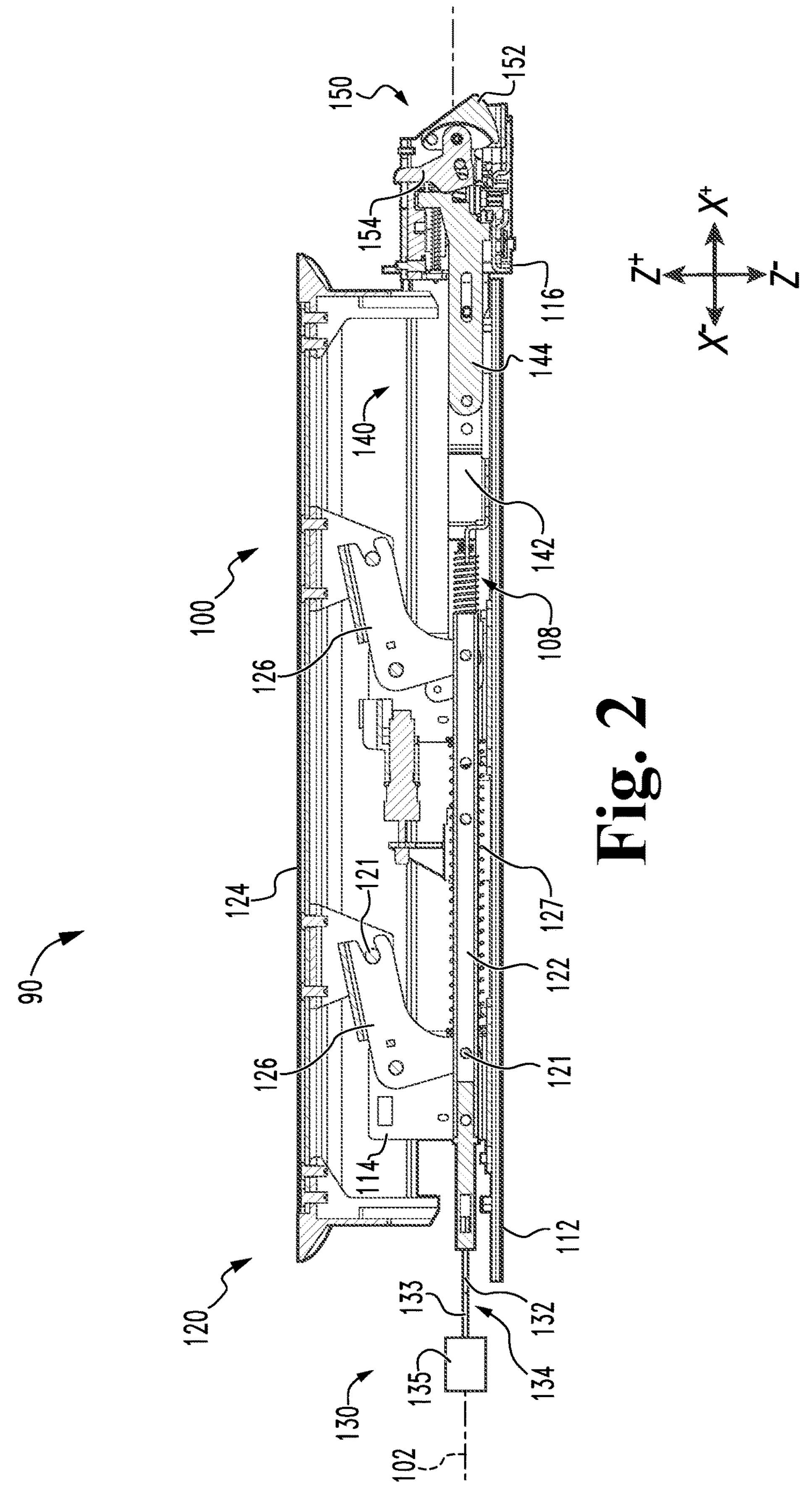
FIG. 2 is a cross-sectional illustration of the exit device illustrated in FIG. 1.

With additional reference to FIG. 2, the exit device 90 generally includes a pushbar assembly 100, which includes a mounting assembly 110 configured for mounting to the door 70, a drive assembly 120 mounted to the mounting assembly 110 for movement between an actuated state and a deactuated state, a latch control assembly 140 operably connected with the drive assembly 120 via a lost motion connection 108, and a latchbolt mechanism 150 operably coupled with the latch control assembly 140. The exit device 90 further includes an electronic actuator assembly 130 that is mounted in the pushbar assembly 100 and is operable to transition the drive assembly 120 between the actuated state and the deactuated state.

As described herein, the drive assembly 120 is biased toward the deactuated state, and is operable to be driven to the actuated state when manually actuated by a user or when electrically actuated by the electronic actuator assembly 130. The latch control assembly 140 also has an actuated state and a deactuated state, and is operably connected with the drive assembly 120 such that actuation of the drive assembly 120 causes a corresponding actuation of the latch control assembly 140.

The mounting assembly 110 generally includes an elongated channel member 111, a base plate 112 mounted in the channel member 111, and a pair of bell crank mounting brackets 114 coupled to the base plate 112. The channel member 111 extends along the longitudinal (X) axis 102, has a width in the lateral (Y) directions, and has a depth in the transverse (Z) directions. Each of the mounting brackets 114 includes a pair of laterally-spaced walls that extend away from the base plate 112 in the forward ($Z^+$) direction. The illustrated mounting assembly 110 also includes a faceplate 113 that encloses a distal end portion of the channel member 111, a header plate 116 positioned adjacent a proximal end of the channel member 111, and a header casing 117 mounted to the header plate 116.

The drive assembly 120 includes a drive rod 122 extending along the longitudinal axis 102, a pushbar 124 having a pair of pushbar brackets 125 mounted to the rear side thereof, and a pair of bell cranks 126 operably connecting the drive rod 122 with the pushbar 124. As described herein, the drive rod 122 is mounted for movement in the longitudinal (X) directions, the pushbar 124 is mounted for movement in the transverse (Z) directions, and the bell cranks 126 couple the drive rod 122 and the pushbar 124 for joint movement during actuation and deactuation of the drive assembly 120. Each bell crank 126 is pivotably mounted to a corresponding one of the bell crank mounting brackets 114. Each bell crank 126 includes a first arm pivotably connected to the drive rod 122, and a second arm pivotably connected to a corresponding one of the pushbar brackets 125. The pivotal connections may, for example, be provided by pivot pins 121. The drive assembly 120 further includes a return spring 127 that is engaged with the mounting assembly 110 and which biases the drive assembly 120 toward its deactuated state.

Each of the drive rod 122 and the pushbar 124 has an actuated position in the actuated state of the drive assembly 120, and a deactuated position in the deactuated state of the drive assembly 120. During actuation and deactuation of the drive assembly 120, the drive rod 122 moves in the longitudinal (X) directions between a proximal deactuated position and a distal actuated position, and the pushbar 124 moves in the transverse (Z) directions between a projected or forward deactuated position and a depressed or rearward actuated position. Thus, during actuation of the drive assembly 120, the drive rod 122 moves in the distal ($X^-$) direction, and the pushbar 124 moves in the rearward ($Z^-$) direction. Conversely, during deactuation of the drive assembly 120, the drive rod 122 moves in the proximal ($X^+$) direction, and the pushbar 124 moves in the forward ($Z^+$) direction. The bell cranks 126 translate longitudinal movement of the drive rod 122 to transverse movement of the pushbar 124, and translate transverse movement of the pushbar 124 to longitudinal movement of the drive rod 122.

With the drive assembly 120 in its deactuated state, a user may depress the pushbar 124 to transition the drive assembly 120 to its actuated state. As the pushbar 124 is driven toward its depressed position, the bell cranks 126 translate the rearward movement of the pushbar 124 to distal movement of the drive rod 122, thereby compressing the return spring 127. When the actuating force is subsequently removed from the pushbar 124, the spring 127 returns the drive rod 122 to its proximal position, and the bell cranks 126 translate the proximal movement of the drive rod 122 to forward movement of the pushbar 124, thereby returning the drive assembly 120 to its deactuated state.

The electronic actuator assembly 130 includes a link 132 operably coupled with the drive rod 122, an input shaft 133 coupled to the link 132 via a lost motion connection 134, and a motor 135 operable to drive the input shaft 133 and the link 132 from a proximal extended position to a distal retracted position. The electronic actuator 130 generally has three states: a retracting state, a holding state, and a releasing state. In the retracting state, the motor 135 exerts a sufficient retracting force on the input shaft 133 to overcome the biasing force of the spring 127 such that the drive rod 122 moves to its retracted position, thereby actuating the drive assembly 120. In the holding state, the motor 135 exerts a sufficient holding force on the input shaft 133 to retain the drive rod 122 in its retracted position against the biasing force of the return spring 127, thereby holding or retaining the drive assembly 120 in its actuated state.

With the motor 135 in the releasing state, the motor 135 exerts a residual holding force resisting movement of the plunger 132 in the proximal direction. The biasing force of the return spring 127 partially counteracts the residual force exerted by the motor 135, but is insufficient to overcome the residual return to the extended positions thereof under the force of the return spring 127. As described herein, the electronic actuator 130 itself provides a supplemental boost force that aids in overcoming the residual force to return the drive assembly 120 to its deactuated state when the actuator 130 is in the releasing state.

The latch control assembly 140 includes a control link 142 and a yoke 144 that is coupled to a retractor 154 of the latchbolt mechanism 150 such that movement of the control link 142 in the distal direction (to the left in FIG. 3) actuates the latchbolt mechanism 150 and retracts the latchbolt 152. The control link 142 is coupled with the drive rod 122 via the lost motion connection 108 such that retraction of the drive rod 122 (i.e., movement of the drive rod from its proximal or extended position to its distal or retracted position) causes a corresponding retraction of the control link 142, thereby retracting the latchbolt 152. Thus, retraction of the drive rod 122 by either the pushbar 124 or the electronic actuator 130 serves to retract the latchbolt 152.

Should the drive assembly 120 remain in its actuated state, the drive rod 122 will remain in its retracted position, and the latchbolt 152 will accordingly remain retracted. Thus, when the electronic actuator 130 is in the holding state, the exit device 90 remains dogged, and the door 70 can be opened from either the secured side or the unsecured side by applying the appropriate one of a pushing force or a pulling force. When power to the actuator 130 is subsequently removed, the drive assembly 120 and the latchbolt mechanism 150 return to the extended or deactuated states thereof under the internal biasing forces of the pushbar assembly 100, including those biasing forces provided by the spring 127 and the electronic actuator assembly 130.

Figure 3:
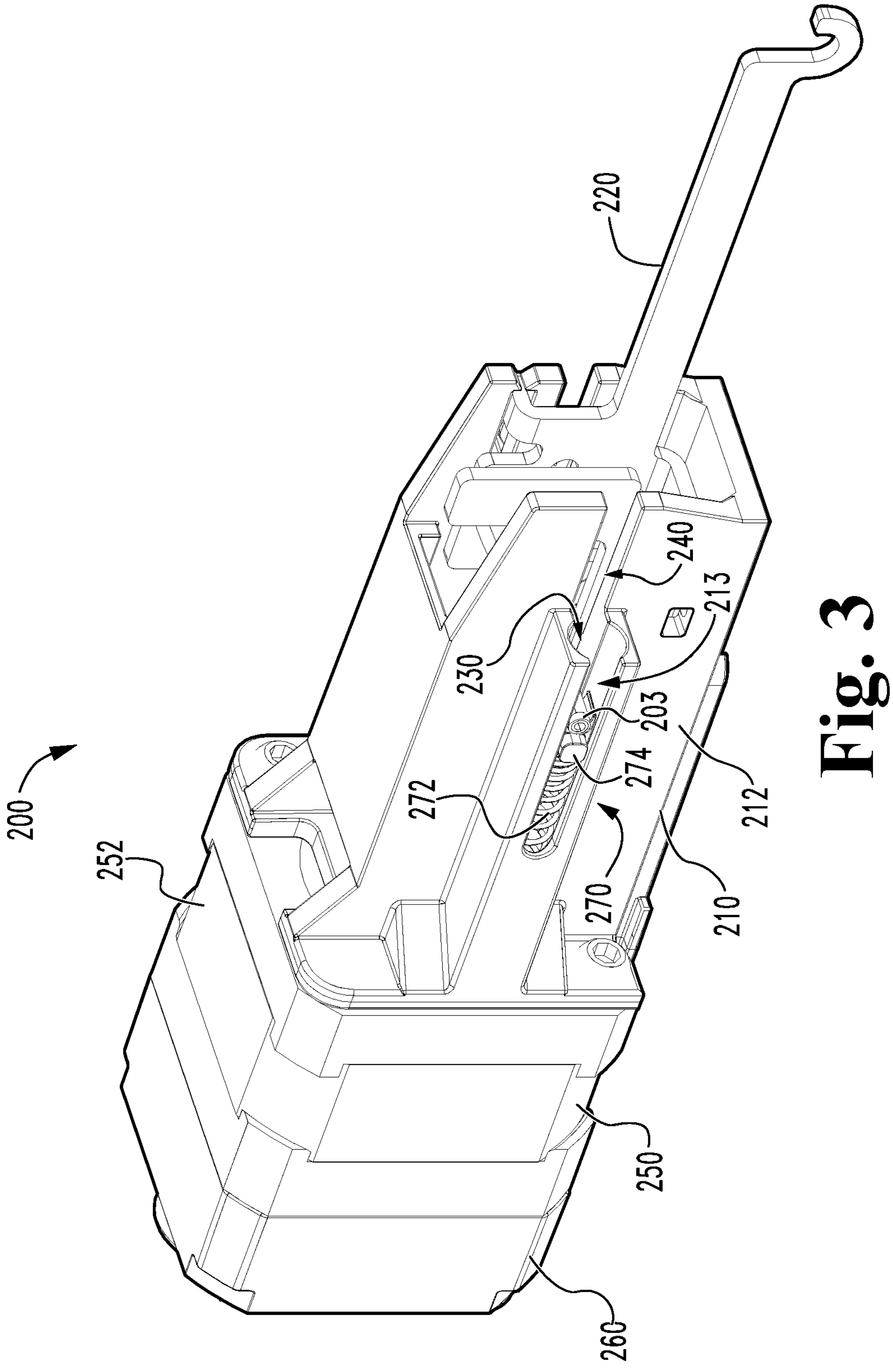
FIG. 3 is a perspective illustration of an electronic actuator assembly according to certain embodiments.
Figure 4:
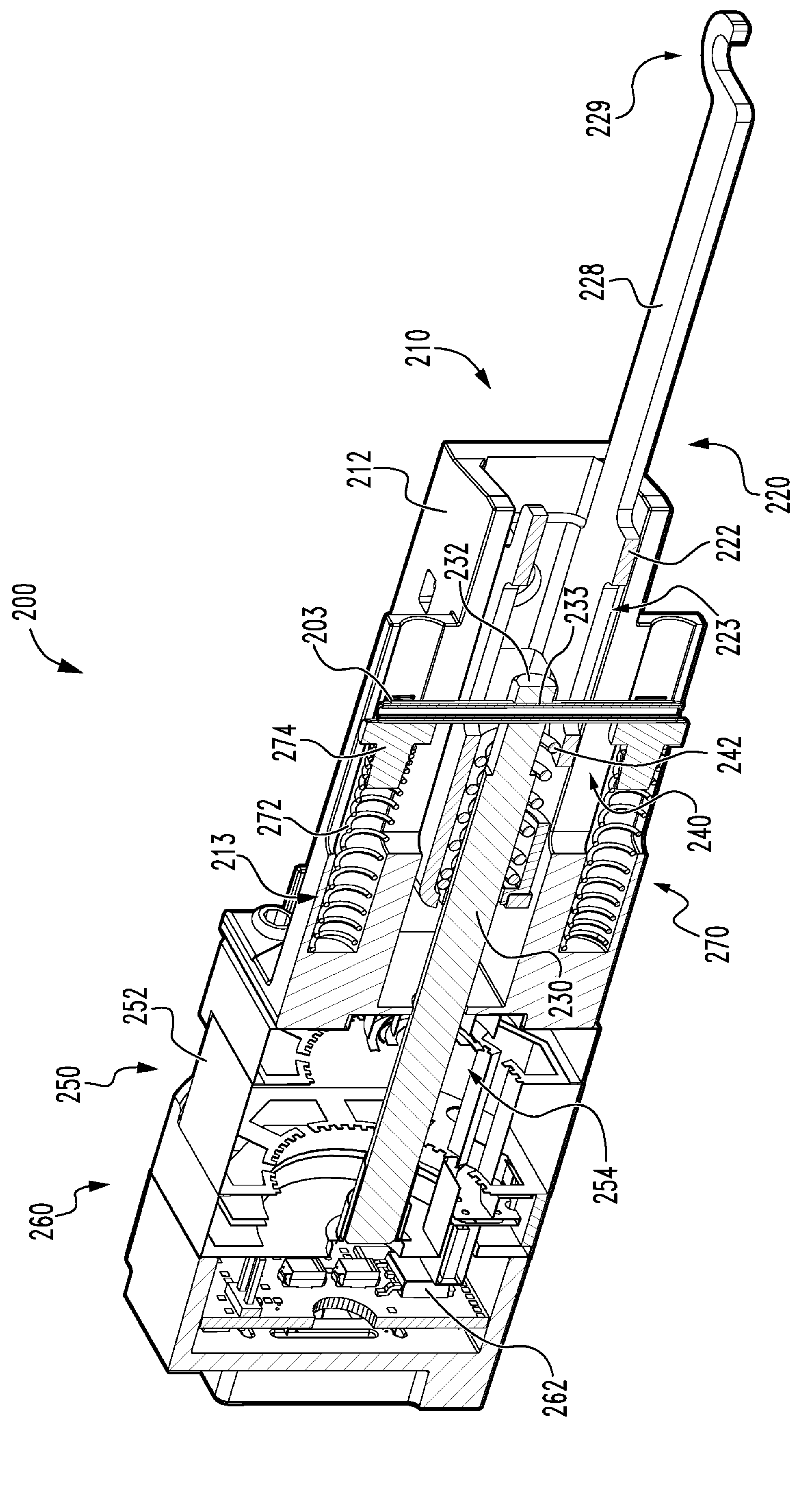
FIG. 4 is a first cross-sectional illustration of the electronic actuator assembly illustrated in FIG. 3.
Figure 5:
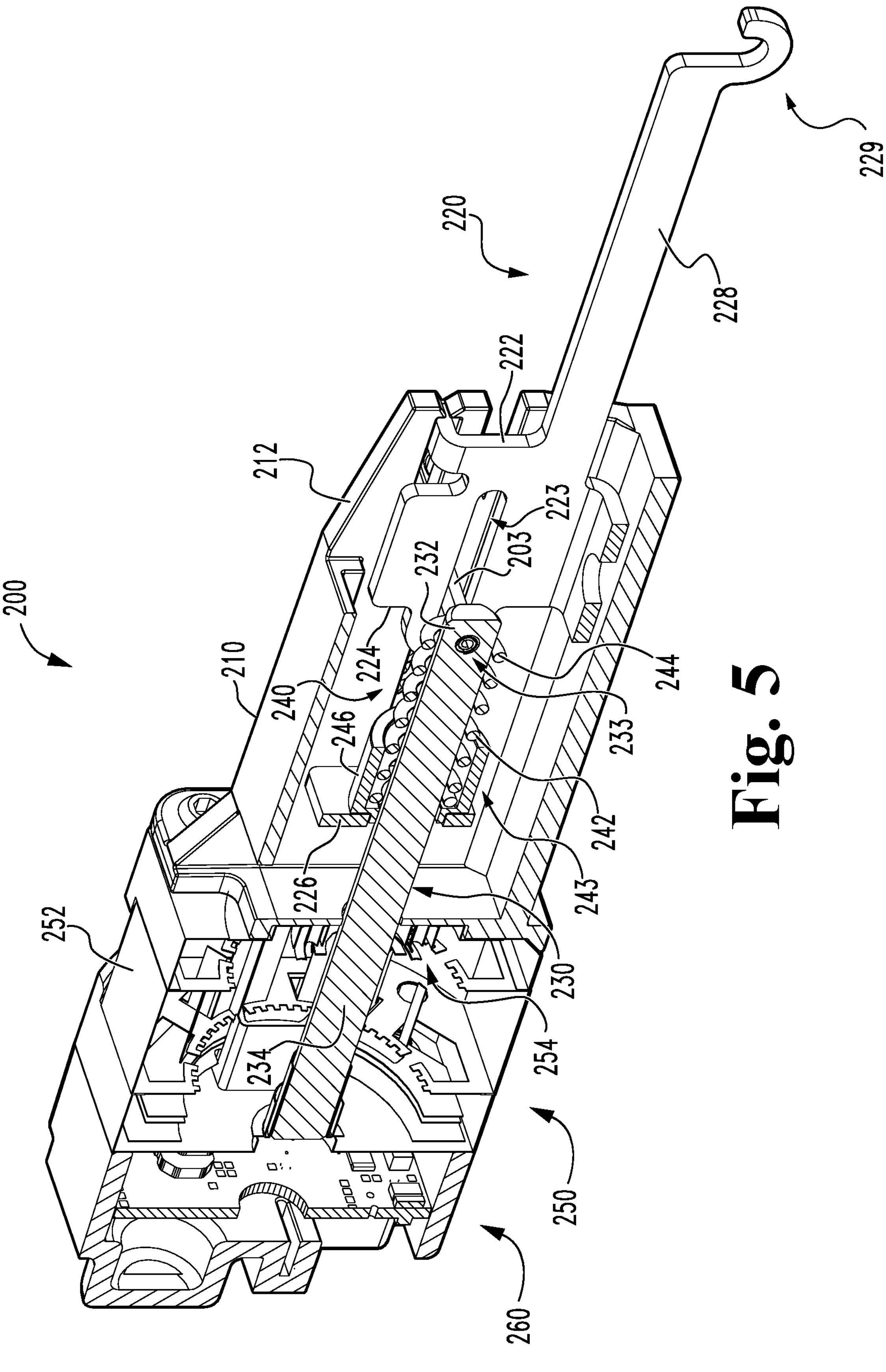
FIG. 5 is a second cross-sectional illustration of the electronic actuator assembly illustrated in FIG. 3.
Figure 6:
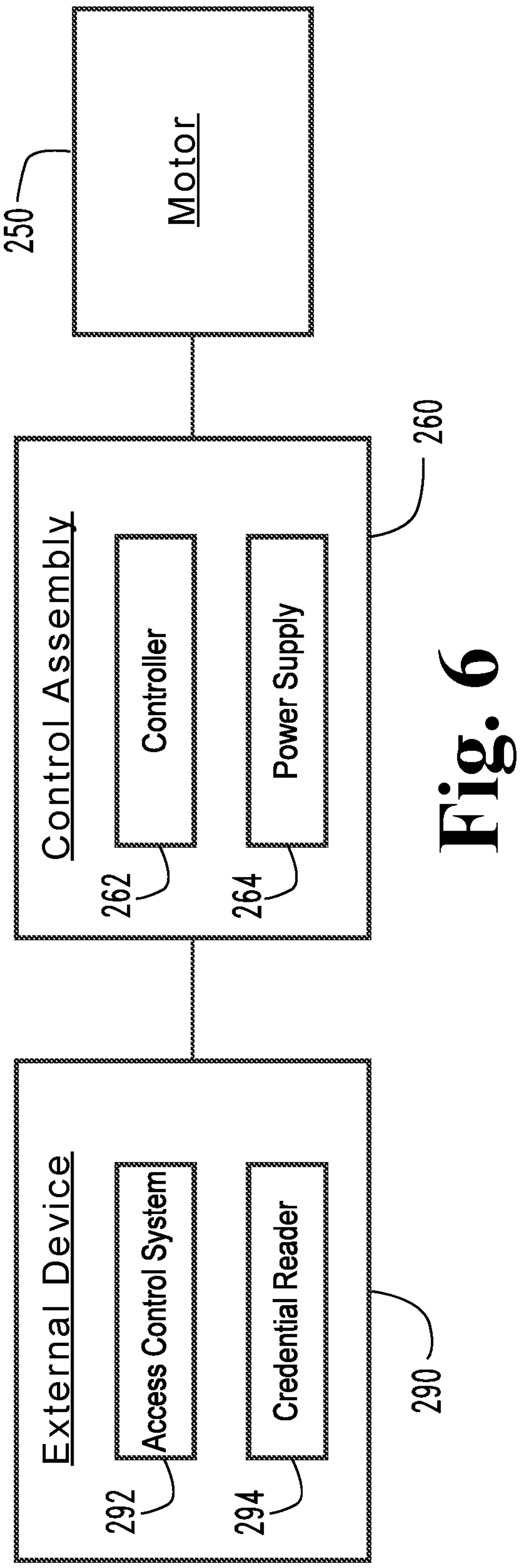
FIG. 6 is a schematic block diagram of a control assembly according to certain embodiments.
Figure 7:
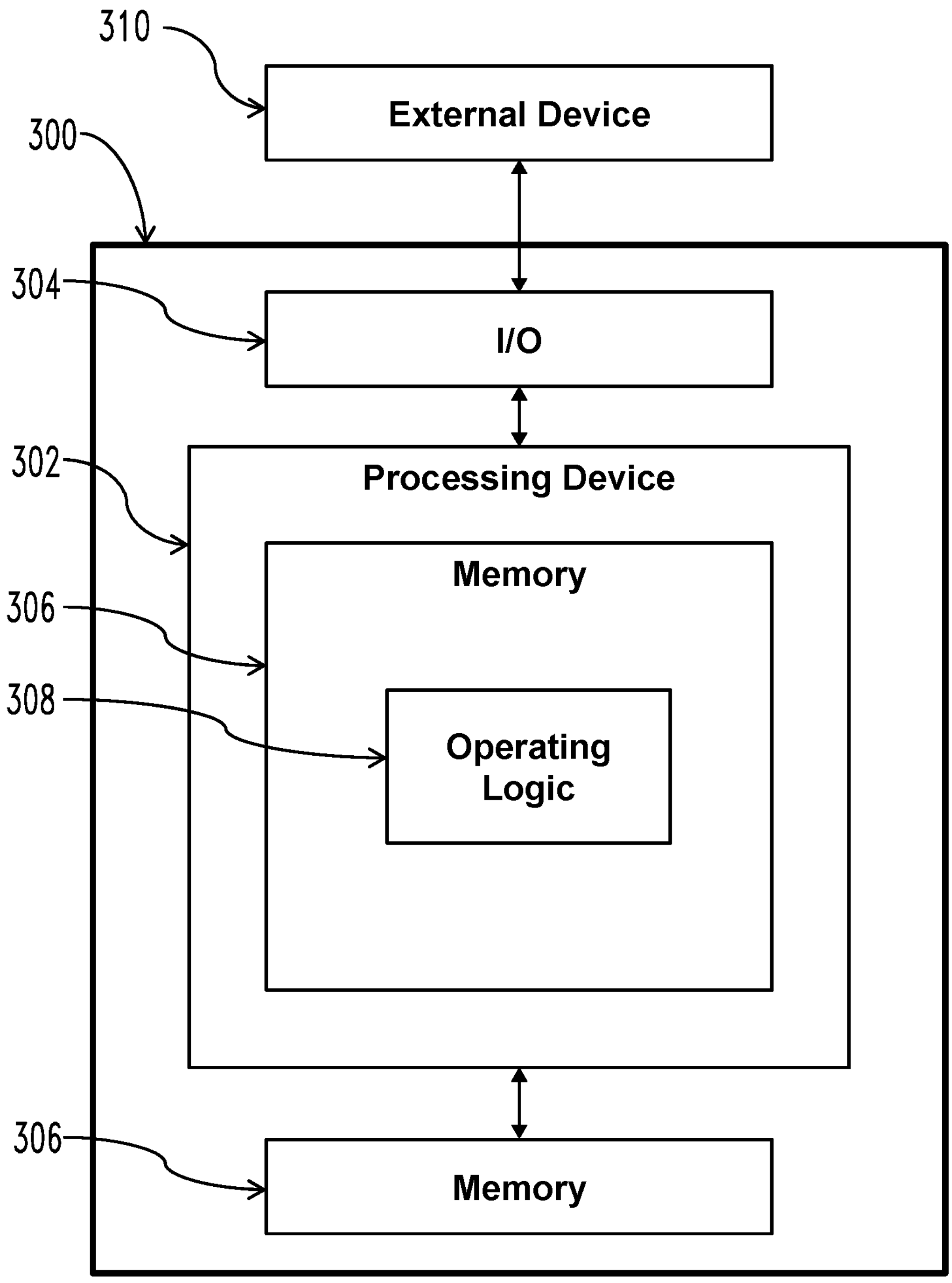
FIG. 7 is a schematic block diagram of a computing device.

With additional reference to FIGS. 3-5, illustrated therein is an electronic actuator assembly 200 according to certain embodiments, which may be utilized as the electronic actuator assembly 130 of the exit device 90. The electronic actuator assembly 200 generally includes a housing 210, a link 220 mounted for sliding reciprocal movement within the housing 210, an input shaft 230 connected to the link 220 via a lost motion connection 240, a motor 250 operable to drive the input shaft 230 in the proximal and distal directions, and a control assembly 260 operable to control operation of the motor 250. As described herein, the electronic actuator assembly 200 further includes a boost assembly 270 acting on the input shaft 230 upstream of the lost motion connection 240 such that the boost assembly 270 at all times biases the input shaft 230 toward its deactuated or proximal position.

The housing 210 is affixed to the body portion 252 of the motor 250, and the actuator assembly 200 is secured to the mounting assembly 110 such that the housing 210 has a fixed position within the pushbar assembly 100. The housing 210 has a pair of sidewalls 212, each of which defines a corresponding and respective one of a pair of longitudinal channels 213. A coupling pin 203 passes through the input shaft 230 and is received in the channels 213 such that the shaft 230 is slidably connected to the housing 210, thereby preventing rotation of the shaft 230 relative to the housing 210.

The link 220 is slidably mounted in the housing 210 for reciprocal movement in the proximal and distal directions. The link 220 is configured for connection to the drive assembly 120 such that movement of the link 220 from a proximal extended position to a distal retracted position causes retraction of the latchbolt 152 in the manner described above. The link 220 includes a body portion 222 defining a pair of longitudinal slots 223 and a shoulder 224, a distal wall 226 positioned distally of the body portion 222, and a proximal arm 228 that extends proximally from the body portion 222 and terminates in a hook 229 by which the link 220 is coupled to the drive rod 122.

The input shaft 230 is operably connected with the motor 250 such that the motor 250 is operable to drive the input shaft 230 in the proximal and distal directions. The input shaft 230 has a proximal end portion 232 defining a through-hole 233 and a distal end portion 234 engaged with the motor 250. In the illustrated form, at least the distal end portion 234 is threaded, and rotation of the shaft 230 relative to the housing 210 and the motor body 252 is prevented at least in part by the coupling pin 203. In certain forms, the input shaft 230 may include a splined section that engages a corresponding splined section in the motor housing 252 to further aid in preventing rotation of the shaft 230. As described herein, the shaft 230 is threadedly engaged with a rotor 254 of the motor 250 such that rotation of the rotor 254 in opposite rotational directions drives the shaft 230 to reciprocate in opposite longitudinal directions.

The lost motion connection 240 is defined in part by the coupling pin 203, and includes an overtravel spring 242 engaged between the link 220 and the input shaft 230. In the illustrated form, the overtravel spring 242 has a distal end 243 that is seated in a collar 246 and is engaged with the distal wall 226, and a proximal end 244 that is engaged with the coupling pin 203 such that the spring 240 is operable to transmit forces between the link 220 and the input shaft 230. As noted above, the coupling pin 203 slidably couples the link 220 and the input shaft 230 to the housing 210. Due to the provision of the longitudinal slots 223, the coupling pin 203 also facilitates lost motion between the link 220 and the input shaft 230, thereby permitting alterations in the relative position of the link 220 and the input shaft 230.

The motor 250 includes a body portion 252 and a rotor 254 that is rotatable relative to the body portion 252. The rotor 254 is threadedly engaged with the threaded distal end portion 234, and the motor 250 is configured to rotate the rotor 254 based upon signals received from the control assembly 260. As noted above, rotation of the shaft 230 relative to the body portion 252 is prevented, for example by engagement between the coupling pin 203 and the housing 210. Thus, rotation of the rotor 254 in a first rotational direction causes the shaft 230 to move in the proximal extending direction, and rotation of the rotor in an opposite second rotational direction causes the shaft 230 to move in the distal retracting direction. In certain embodiments, the motor 250 may be a rotary motor, such as a stepper motor. In other embodiments, the motor 250 may be provided in the form of a solenoid that does not include a rotor 254, and the input shaft 230 may be provided as the plunger of the solenoid.

With additional reference to FIG. 5, the control assembly 260 is in communication with the motor 250, and includes a controller 262 configured to control operation of the motor 250. The controller 262 is connected to a power supply 264, and is configured to operate the motor 250 using power from the power supply 264. More particularly, the controller 262 is configured to power the motor 250 to cause the actuator assembly 200 to operate in the retracting state, the holding state, and the releasing state. As will be appreciated, operating the actuator assembly 200 in the retracting, holding, and releasing states causes retraction, holding, and releasing of the latchbolt 152 in the manner described above. The controller 262 may further be in communication with an external device 290 such as an access control system 292 and/or a credential reader 294, and may operate the motor 250 based upon commands received from the external device 290.

In embodiments in which the motor 250 is provided in the form of a stepper motor, the controller 262 may provide the motor 250 with a series of electrical pulses to operate the actuator assembly 200 in the retracting state, may provide the motor 250 with a sustained pulse to operate the actuator assembly 200 in the holding state, and may cut power to the motor 250 to operate the actuator assembly 200 in the release state. In embodiments in which the motor 250 is provided in the form of a standard rotary motor or a solenoid, the controller 262 may provide the motor 250 with a relatively high in-rush current to operate the actuator assembly 200 in the retracting state, may provide the motor 250 with a relatively low operating current to operate the actuator assembly 200 in the holding state, and may cut power to the motor 250 to operate the actuator assembly 200 in the releasing state.

The boost assembly 270 is mounted to the housing 210 and is engaged with the input shaft 230 such that the boost assembly 270 exerts a proximal boost force urging the input shaft 230 toward its proximal or extended position. In the illustrated form, the boost assembly 270 includes a pair of boost springs 272, each of which is seated in a corresponding and respective one of the channels 213. The boost assembly 270 further includes a pair of couplers 274 that couple first ends of the boost springs 272 with the coupling pin 203. The opposite second ends of the boost springs 272 are engaged with the ends of the channels 213 such that the boost springs 272 are captured between the housing 210 and the coupling pin 203.

During electronic operation of the exit device 90, the pushbar assembly 100 may begin in its deactuated state. In response to an actuating input (e.g., presentation of an authorized credential or receipt of an unlocking command from the access control system 292), the control assembly 260 operates the motor 250 in the retracting state to rotate the rotor 254 in an unlocking direction. As a result, the input shaft 230 moves from its extended position to its overtravel position, thereby compressing the springs 272 of the boost assembly 270 and storing mechanical energy therein. Movement of the shaft 230 from its proximal extended position to its intermediate retracted position causes a corresponding movement of the link 220 from its proximal extended position to its distal retracted position, thereby retracting the drive rod 122 and actuating the drive assembly 120 in the manner described above.

As the input shaft 230 moves from its intermediate retracted position to its distal overtravel position, the link 220 remains in its distal retracted position, thereby causing the overtravel spring 260 to compress. As will be appreciated, this compression stores mechanical energy in the overtravel spring 260, thereby increasing the biasing force exerted by the overtravel spring 260. As such, the biasing force exerted by the overtravel spring 260 depends in part upon the relative position of the link 220 and the input shaft 230. By contrast, the boost force provided by the boost assembly 270 depends solely upon the position of the shaft 230 relative to the housing 210, and is therefore independent of the relative position of the link 220 and the input shaft 230, as well as of the state of the drive assembly 120.

When the input shaft 230 reaches the distal overtravel position, the control assembly 260 may operate the motor 250 in the holding state for a period of time. When operating in the holding state, the motor 250 exerts a holding force on the input shaft 230 that retains the input shaft 230 in the distal overtravel position against the combined biasing force of the return spring 127 and the boost assembly 270.

Following the holding operation, the control assembly 260 may cause the motor 250 to operate in a releasing state, for example by cutting power to the motor 250. Those skilled in the art will readily appreciate that in such instances, the motor 250 may nonetheless exert a residual holding force resisting movement of the input shaft 230, thereby resisting deactuation of the drive assembly 120. While the biasing force provided by the return spring 127 is greatest when the drive assembly 120 is in the actuated state, in certain circumstances, this biasing force may be insufficient to overcome the residual force of the motor 250 in the releasing state. In such circumstances, the pushbar assembly 100 may fail to return to the deactuated state, thereby potentially permitting entry to unauthorized individuals.

In circumstances such as those described above, the pushbar assembly 100 of the current exit device 90 will nonetheless be able to return to the deactuated state despite the failure of the return spring 127 to overcome the residual holding force of the motor 250. As noted above, the total force urging the input shaft 230 in the proximal deactuating direction includes not only the biasing force exerted by the return spring 127, but also the boost force exerted by the boost assembly 270. The boost force provided by the boost assembly 270 supplements the biasing force of the return spring 127 such that the combined force, which includes both the biasing force and the boost force, is sufficient to overcome the residual force of the motor 250 to return the input shaft 230 to its proximal or extended position.

During manual actuation of the pushbar assembly 100, the user depresses the pushbar 124 to retract the drive rod 122 in the manner described above. As will be appreciated, such distal movement of the drive rod 122 may cause a corresponding distal movement of the link 220. Due to the lost motion connection 240, however, this distal movement of the link 220 is not transmitted to the input shaft 230. Thus, during manual actuation of the pushbar assembly 100, the user need not overcome the residual force exerted by the motor 250 or the boost force exerted by the boost assembly 270. As a result, the force required to manually actuate the pushbar assembly 100 is unchanged.

Certain industry standards require that the actuating force not exceed a threshold value, and existing pushbar assemblies typically have an actuating force requirement approaching that threshold value. For example, where industry standards require that the actuating force not exceed five pounds, the actuating force for the pushbar assembly 100 may be about five pounds. Thus, if the electronic actuating assembly 200 were to increase the actuating force for the pushbar assembly 100, the actuating assembly 200 would not be permitted to be used with the pushbar assembly 100. However, due to the fact that the actuating assembly 200 does not appreciably increase the actuating force for the pushbar assembly 100, the actuating assembly 200 is capable of being used in combination with existing pushbar assemblies without requiring modification of the pushbar assembly 100.

In certain forms, the electronic actuating assembly 200 may be provided as a modular retrofit for an existing pushbar assembly 100. In particular, the electronic actuating assembly 200 may be utilized as a retrofit for existing pushbar assemblies 100 in which the biasing force urging the drive assembly 120 to its deactuated state is insufficient to overcome the residual force resisting movement of the input shaft 230 when the motor 250 is operating in the release state. In such forms, the boost force provided by the boost assembly 270 supplements the biasing force acting on the drive assembly 120, and the combined force is sufficient to drive the input shaft 230 to its proximal extended position against the residual holding force applied by the motor 250. As will be appreciated, such a retrofit would not materially alter the actuating force for the pushbar assembly 100, thereby maintaining compliance with industry standards.

It is also contemplated that the electronic actuating assembly 200 may be provided in the exit device 90 at the time of initial sale. For example, the exit device 90 may include a pushbar assembly 100, the biasing force of which is insufficient to overcome the residual holding force of the motor 250, and the electronic actuator assembly 200, the boost assembly 270 of which supplements the biasing force to provide a combined force that is sufficient to overcome the residual holding force of the spring. Thus, the manufacturer may utilize existing pushbar assemblies 100 in the exit device 90 to provide for electronic retraction of the latchbolt 152 while maintaining compliance with industry standards.

FIG. 3 is a schematic block diagram of a computing device 300. The computing device 300 is one example of a computer, server, mobile device, or equipment configuration that may be utilized in connection with the control assembly 260. The computing device 300 includes a processing device 302, an input/output device 304, memory 306, and operating logic 308. Furthermore, the computing device 300 communicates with one or more external devices 310.

The input/output device 304 allows the computing device 300 to communicate with the external device 310. For example, the input/output device 304 may be a network adapter, network card, interface, or a port (e.g., a USB port, serial port, parallel port, an analog port, a digital port, VGA, DVI, HDMI, FireWire, CAT 5, or any other type of port or interface). The input/output device 304 may be comprised of hardware, software, and/or firmware. It is contemplated that the input/output device 304 includes more than one of these adapters, cards, or ports.

The external device 310 may be any type of device that allows data to be inputted or outputted from the computing device 300. For example, the external device 310 may be a mobile device, a reader device, equipment, a handheld computer, a diagnostic tool, a controller, a computer, a server, a printer, a display, an alarm, an illuminated indicator such as a status indicator, a keyboard, a mouse, or a touch screen display. Furthermore, it is contemplated that the external device 310 may be integrated into the computing device 300. It is further contemplated that there may be more than one external device in communication with the computing device 300.

The processing device 302 can be of a programmable type, a dedicated, hardwired state machine, or a combination of these; and can further include multiple processors, Arithmetic-Logic Units (ALUs), Central Processing Units (CPUs), Digital Signal Processors (DSPs) or the like. For forms of the processing device 302 with multiple processing units, distributed, pipelined, and/or parallel processing can be utilized as appropriate. The processing device 302 may be dedicated to performance of just the operations described herein or may be utilized in one or more additional applications. In the depicted form, the processing device 302 is of a programmable variety that executes algorithms and processes data in accordance with operating logic 308 as defined by programming instructions (such as software or firmware) stored in memory 306. Alternatively or additionally, the operating logic 308 for the processing device 302 is at least partially defined by hardwired logic or other hardware. The processing device 302 can be comprised of one or more components of any type suitable to process the signals received from input/output device 304 or elsewhere, and provide desired output signals. Such components may include digital circuitry, analog circuitry, or a combination of both.

The memory 306 may be of one or more types, such as a solid-state variety, electromagnetic variety, optical variety, or a combination of these forms. Furthermore, the memory 306 can be volatile, nonvolatile, or a combination of these types, and some or all of memory 306 can be of a portable variety, such as a disk, tape, memory stick, cartridge, or the like. In addition, the memory 306 can store data that is manipulated by the operating logic 308 of the processing device 302, such as data representative of signals received from and/or sent to the input/output device 304 in addition to or in lieu of storing programming instructions defining the operating logic 308, just to name one example. As illustrated, the memory 306 may be included with the processing device 302 and/or coupled to the processing device 302.

The processes in the present application may be implemented in the operating logic 308 as operations by software, hardware, artificial intelligence, fuzzy logic, or any combination thereof, or at least partially performed by a user or operator. In certain embodiments, units represent software elements as a computer program encoded on a non-transitory computer readable medium, wherein the control assembly 260 performs the described operations when executing the computer program.

Although the electronic actuating assembly 200 has been described herein as being configured for use with the pushbar assembly 100, it is to be appreciated that the electronic actuator assembly 200 may be utilized in combination with other forms of pushbar assemblies. For example, while the illustrated pushbar assembly 100 is provided in a rim format, in which the latchbolt mechanism 150 is provided in the header case 117, it is also contemplated that the electronic actuator assembly 200 may be utilized in combination with mortise-format exit devices or vertical exit devices. Additionally, while one configuration of a rim-format pushbar assembly 100 is illustrated, it is to be appreciated that the actuator assembly 200 may be used in combination with rim-format pushbar assemblies of other configurations.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A pushbar assembly, comprising:
a pushbar having a projected position and a depressed position;
a primary spring urging the pushbar toward the projected position;
a linear motor comprising a motor shaft, wherein the linear motor is configured to drive the motor shaft from a proximal position to a distal position when supplied with a driving power, wherein the motor shaft is connected with the pushbar such that movement of the motor shaft from the proximal position to the distal position depresses the pushbar; and
a boost assembly urging the motor shaft toward the proximal position, the boost assembly comprising at least one boost spring; and
wherein, when the linear motor is unpowered, the primary spring and the boost assembly cooperate to back-drive the motor and return the motor shaft to the proximal position, thereby returning the pushbar to the projected position.

2. The pushbar assembly of claim 1, further comprising a housing having a fixed position within the pushbar assembly, wherein the at least one boost spring is engaged between the housing and the motor shaft.

3. The pushbar assembly of claim 2, wherein the motor shaft comprises a through-hole through which a pin extends; and
wherein the at least one boost spring is engaged between the housing and the pin.

4. The pushbar assembly of claim 3, wherein the at least one boost spring comprises two boost springs; and
wherein the two boost springs are positioned on opposite sides of the motor shaft.

5. The pushbar assembly of claim 1, wherein the primary spring alone is insufficient to back-drive the motor.

6. The pushbar assembly of claim 1, further comprising a latchbolt having an extended position and a retracted position; and
wherein depression of the pushbar retracts the latchbolt.

7. The pushbar assembly of claim 1, further comprising:
a link connected with the motor shaft via a lost motion connection; and
an overtravel spring connected between the link and the motor shaft; and
wherein the link is connected between the motor shaft and the pushbar.

8. A system, comprising:
a pushbar assembly, comprising:
a pushbar having a projected position and a depressed position; and
a bias assembly comprising at least one spring, the bias assembly urging the pushbar toward the projected position; and
a drive module, comprising:
a linear motor operable to drive a motor shaft from a proximal position to a distal position when the linear motor is supplied with driving power; and
a boost assembly urging the motor shaft toward the proximal position, the boost assembly comprising a first boost spring;
wherein the motor shaft is connected with the pushbar such that movement of the motor shaft from the proximal position to the distal position depresses the pushbar; and
wherein, when the linear motor is unpowered, the at least one spring and the boost assembly cooperate to overcome a residual holding force of the motor and return the motor shaft to the distal position, thereby returning the pushbar to the projected position.

9. The system of claim 8, further comprising a latchbolt having an extended position and a retracted position; and
wherein depression of the pushbar retracts the latchbolt.

10. The system of claim 8, wherein the bias assembly alone is insufficient to overcome the residual holding force of the motor.

11. The system of claim 8, wherein the boost assembly further comprises:
a housing including a longitudinally-extending first slot; and
a pin extending from the motor shaft into the first slot; and
wherein the first boost spring is engaged between the housing and the pin.

12. The system of claim 11, wherein the housing further comprises a longitudinally-extending second slot;
wherein the pin extends into the second slot; and
wherein the boost assembly further comprises a second boost spring engaged between the housing and the pin.

13. The system of claim 8, wherein the drive module further comprises:
a link connected with the motor shaft via a lost motion connection; and
an overtravel spring connected between the link and the motor shaft; and
wherein the link is connected between the motor shaft and the pushbar.

14. A method of using the pushbar assembly of claim 1, comprising:
supplying the linear motor with the driving power, thereby driving the motor shaft from the proximal position to the distal position against a boost force of the boost assembly;
in response to movement of the motor shaft from the proximal position to the distal position, moving the pushbar of the pushbar assembly from the projected position toward the depressed position against a primary biasing force of the primary spring; and
ceasing the supplying of the driving power to the linear motor; and
wherein, with the supplying of the driving power ceased, the boost force and the primary biasing force cooperate to overcome a residual holding force of the linear motor, thereby returning the motor shaft to the proximal position and returning the pushbar to the projected position.

15. The method of claim 14, wherein the primary biasing force alone is insufficient to overcome the residual holding force of the linear motor.

16. The method of claim 14, wherein the boost force alone is insufficient to overcome the residual holding force of the linear motor.

17. The method of claim 14, further comprising installing a drive module to the pushbar assembly, the drive module including the linear motor, the motor shaft, and the boost assembly.

18. The method of claim 14, further comprising:

in response to movement of the motor shaft from the proximal position to an intermediate position, causing an overtravel spring to drive a link from a first position to a second position, thereby moving the pushbar from the projected position to the depressed position; and in response to movement of the motor shaft from the intermediate position to the distal position, storing energy in the overtravel spring while maintaining the link in the second position.

19. The method of claim 14, wherein the at least one boost spring of the boost assembly comprises a first boost spring and a second boost spring;

wherein a pin extends through the motor shaft;

wherein the first boost spring is engaged with a first end portion of the pin; and wherein the second boost spring is engaged with a second end portion of the pin, the second end portion opposite the first end portion.

20. The method of claim 19, wherein each of the first boost spring and the second boost spring is engaged between the pin and a housing, the housing having a fixed position within the pushbar assembly.

* * * * *